United States Patent
Nakano et al.

[11] Patent Number: 5,614,800
[45] Date of Patent: Mar. 25, 1997

[54] METHOD AND APPARATUS FOR PREPARING NUMERICAL CONTROL DATA

[75] Inventors: Hiroyuki Nakano, Tokai; Akira Saito, Obu, both of Japan

[73] Assignee: Toyoda Koki Kabushiki Kaisha, Kariya, Japan

[21] Appl. No.: 314,296

[22] Filed: Sep. 30, 1994

[30] Foreign Application Priority Data

Sep. 30, 1993 [JP] Japan .................................. 5-268164

[51] Int. Cl.$^6$ ................................. G05B 19/416
[52] U.S. Cl. ................. 318/568.18; 318/569; 318/570; 318/571; 318/573; 364/474.31; 364/474.29
[58] Field of Search ................................... 318/574, 573, 318/569, 600, 568.18, 570, 571, 56; 364/474.31, 474.29, 474.3

[56] References Cited

U.S. PATENT DOCUMENTS

| Re. 28,766 | 4/1976 | Villano | 318/573 R |
| 3,831,487 | 8/1974 | Villano | 318/573 X |
| 5,103,150 | 4/1992 | Sasaki et al. | 318/568.18 |

*Primary Examiner*—Karen Masih
*Attorney, Agent, or Firm*—Oblon, Spivak, McClelland, Maier & Neustadt, P.C.

[57] ABSTRACT

An apparatus for preparing NC data is used in machining an involute curve on a workpiece by relatively moving a tool and the workpiece along mutually perpendicular first and second axes encompassed within a plane while relatively rotating the tool and the workpiece about a third axis which is perpendicular to the plane. In the apparatus, there is provided involute curve definition devie defines the involute curve based upon input parameters, machining point calculation means calculates a series of machining points on the involute curve, and tangential line calculation device calculates a tangential line which connects the involute curve at each of the machining points. The apparatus further includes angle calculation device calculates a conversion angle through which each of the machining points is to be rotated about the third axis so as to make the tangential line at each of the machining points intersect one of the first and second axes at a right angle, coordinate conversion device converts coordinate values of each of the machining points into modified coordinate values which each of the machining points would have if the same were rotated about the third axis through the conversion angle calculated by the angle calculation device, and data preparation device prepares NC data of numerous data blocks each including the conversion angle and the converted coordinate values of each of the machining points.

9 Claims, 5 Drawing Sheets

METHOD AND APPARATUS FOR PREPARING NUMERICAL CONTROL DATA

BACKGROUND OF THE INVENTION

1. Field of the Invention

The present invention relates to a method and apparatus for automatically preparing numerical control data (NC data), and more particularly, it relates to a method and apparatus for automatically preparing NC data used in a workpiece having a shape which is defined by an involute curve.

2. Discussion of the Prior Art

To machine a scroll groove formed on a scroll plate of a scroll compressor, first, NC data therefor is calculated based upon the following basic equations for an involute curve defining the scroll shape.

$$X = a \cdot (\cos(\phi) + (\phi \pm \alpha) \cdot \sin(\phi)) \quad (1)$$

$$Y = a \cdot (\sin(\phi) - (\phi \pm \alpha) \cdot \cos(\phi)) \quad (2)$$

Herein, (a) represents the radius of a base circle, ($\phi$) represents the expansion angle of the involute curve, and ($\alpha$) represents a phase angle which determines a width between an outer wall and an inner wall of the scroll groove or curve. Further, ($\phi+\alpha$) represents the outer wall of the involute curve and ($\phi-\alpha$) represents the inner wall thereof.

A series of machining points are calculated which are along the involute curves determined by the basic equations (1) and (2). Subsequently, NC data which simultaneously controls two axes of an X-axis and a C-axis to relatively move a tool along the series of machining points is prepared. In a machine tool, the tool is moved according to the NC data along the X-axis, during which time the workpiece is rotated around the C-axis, so that the scroll shape can be machined.

The machining of the workpiece in the machine tool is described with reference to FIG. 1. FIG. 1 shows a plan view of a workpiece 73. The machine tool rotates the workpiece 73 having a thickness around a C-axis (in the direction indicated by the arrow in FIG. 1) according to the aforementioned NC data. At the same time, the tool 71 is gradually moved along an X-axis extending in a horizontal direction in FIG. 1. This causes an outer wall 73a and an inner wall 73b of the workpiece 73 to be machined, whereby a scroll plate 73 having a desired shape can be obtained. In order to maintain the perpendicularity of the tool 71 relative to the machined surface at respective machining points, the tool 71 is moved along a base line 75 parallel to the X-axis which is offset by the radius (a) of a base circle 76 in the direction of a Y-axis. In the case that the aforementioned basic equations (1) and (2) for involute curve are used in the machining, the radius (a) of the base circle is constant, so that the perpendicularity of the tool 71 relative to the machined surface can be kept simply by moving the tool 71 along the base line 75 which is offset by the radius "a" in the Y-axis direction from the beginning to ending of machining the involute shape.

An air conditioner using the scroll compressor is advantageous because of its high efficiency and its quietness. However, various involute curve have been tested in terms of what kind shapes for a pair of scroll plates of scroll compressors can heighten the efficiency of the scroll compressor. As a result of the test, it was found that very good result is obtained by using scroll plates which are machined in accordance with machining data delivered from equations which are modified from the aforementioned involute basic equations (1) and (2).

A higher efficiency is obtained by using the following equations for the involute curve, for example.

$$X = a \cdot (\cos(\phi) + (\phi \pm \alpha)^k \cdot \sin(\phi)) \quad (3)$$

$$Y = a \cdot (\sin(\phi) - (\phi \pm \alpha)^k \cdot \cos(\phi)) \quad (4)$$

Where, "k" is 2, 3, ······.

However, the involute curve defined by the equations (3) and (4) is of the type that the radius (a) of the base circle 76 increases continuously as the expansion angle ($\phi$) goes. In FIG. 2, the base circle which is grown up as the expansion angle ($\phi$) goes to position the tool 71 as shown therein is indicated by the broken line 78 and will be referred to as "equivalent base circle" hereinafter. As understood from FIG. 2, the radius (a') of the equivalent base circle 78 is larger than the radius (a) of the base circle 76, so that where the tool 71 is located at a position which is offset by the radius (a) of the base circle 76 in the Y-axis direction, the tool 71 cannot keep the perpendicularity with respect to the machined surface of the workpiece 73. Therefore, in the case of the machining which depends on the aforementioned equations (3) and (4) for the involute curve, it is impossible to accurately machine the shapes defined by the aforementioned equations for involute curve, because in the same manner as the above-mentioned prior art if the tool 71 were moved throughout the whole of machining operation along the base line 75 which is offset by the radius (a) of the base circle in the Y-axis direction, the perpendicularity of the tool 71 relative to the workpiece 73 would not be kept at respective machining points.

SUMMARY OF THE INVENTION

Accordingly, it is an object of the present invention to provide a method and apparatus capable of automatically preparing NC data for use in machining various involute curves in high accuracy.

Another object of the present invention is to provide a method and apparatus capable of automatically preparing NC data for use in machining various involute curves under the three-axis control.

Briefly, according to the present invention, there is provided a method and apparatus for preparing NC data used in machining an involute curve on a workpiece by relatively moving a tool and the workpiece along mutually perpendicular first and second axes encompassed within a plane while relatively rotating the tool and the workpiece about a third axis which is perpendicular to the plane.

In an apparatus according to the present invention, there are provided involute curve definition means defines the involute curve based upon input parameters, machining point calculation means calculates a series of machining points on the involute curve, and tangential line calculation means calculates a tangential line which connects the involute curve at each of the machining points. The apparatus further includes angle calculation means calculates a conversion angle through which each of the machining points is to be rotated about the third axis so as to make the tangential line at each of the machining points intersect one of the first and second axes at a right angle, coordinate conversion means converts coordinate values of each of the machining points into modified coordinate values which each of the machining points would have if the same were rotated about the third axis through the conversion angle calculated by the angle calculation means, and data preparation means prepares NC data of numerous data blocks each including the conversion angle and the converted coordinate values of each of the machining points.

With this configuration, there can be automatically prepared NC data for machining an involute curve in a simultaneously controlled three-axis machine tool including at least one rotational axis. Since the NC data make a cutting tool engage the involute curve perpendicularly, the machining accuracy of the involute curve can be improved.

In another aspect of the present invention, there can be automatically prepared NC data which is particularly designed for use in machining an involute curve of the type that the radius of a base circle thereof is gradually enlarged as the expansion angle thereof goes.

BRIEF DESCRIPTION OF THE ACCOMPANYING DRAWINGS

Various other objects, features and many of the attendant advantages of the present invention will be readily appreciated as the same becomes better understood by reference to the following detailed description of a preferred embodiment when considered in connection with the accompanying drawings, in which.

Figure 6:
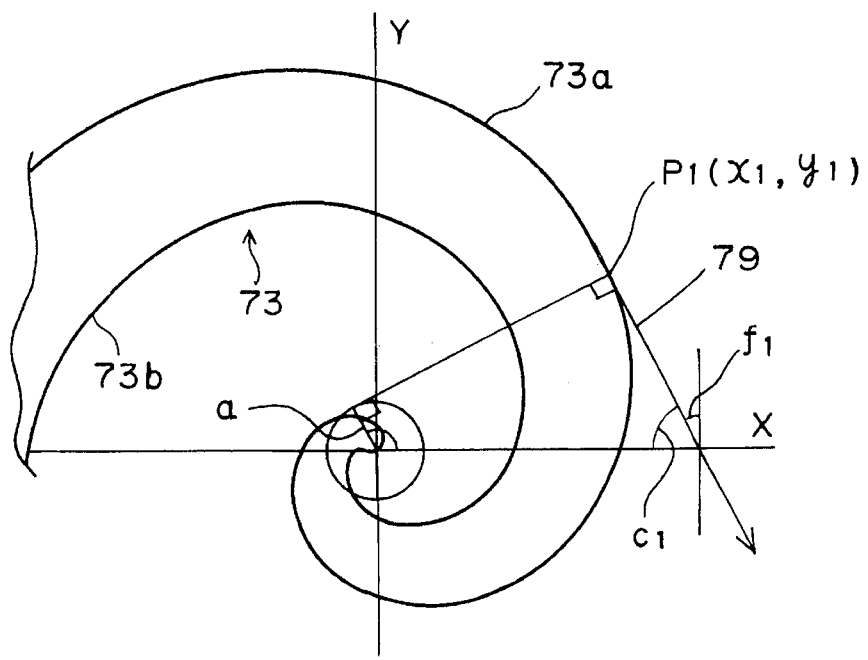
Figure 6:
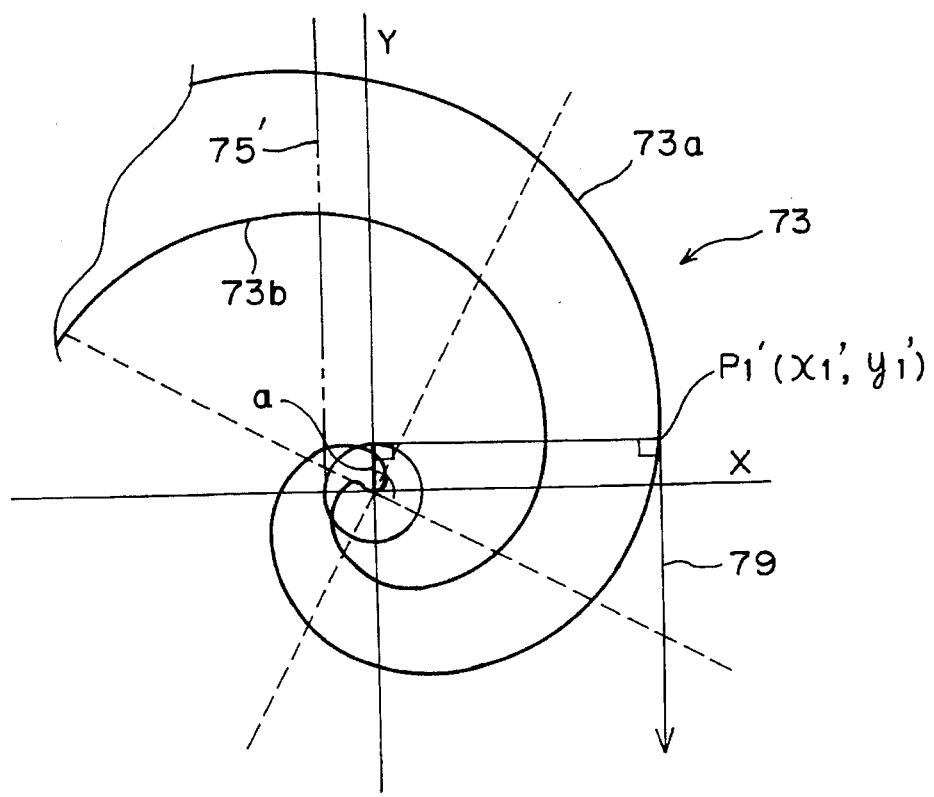
Figure 7:
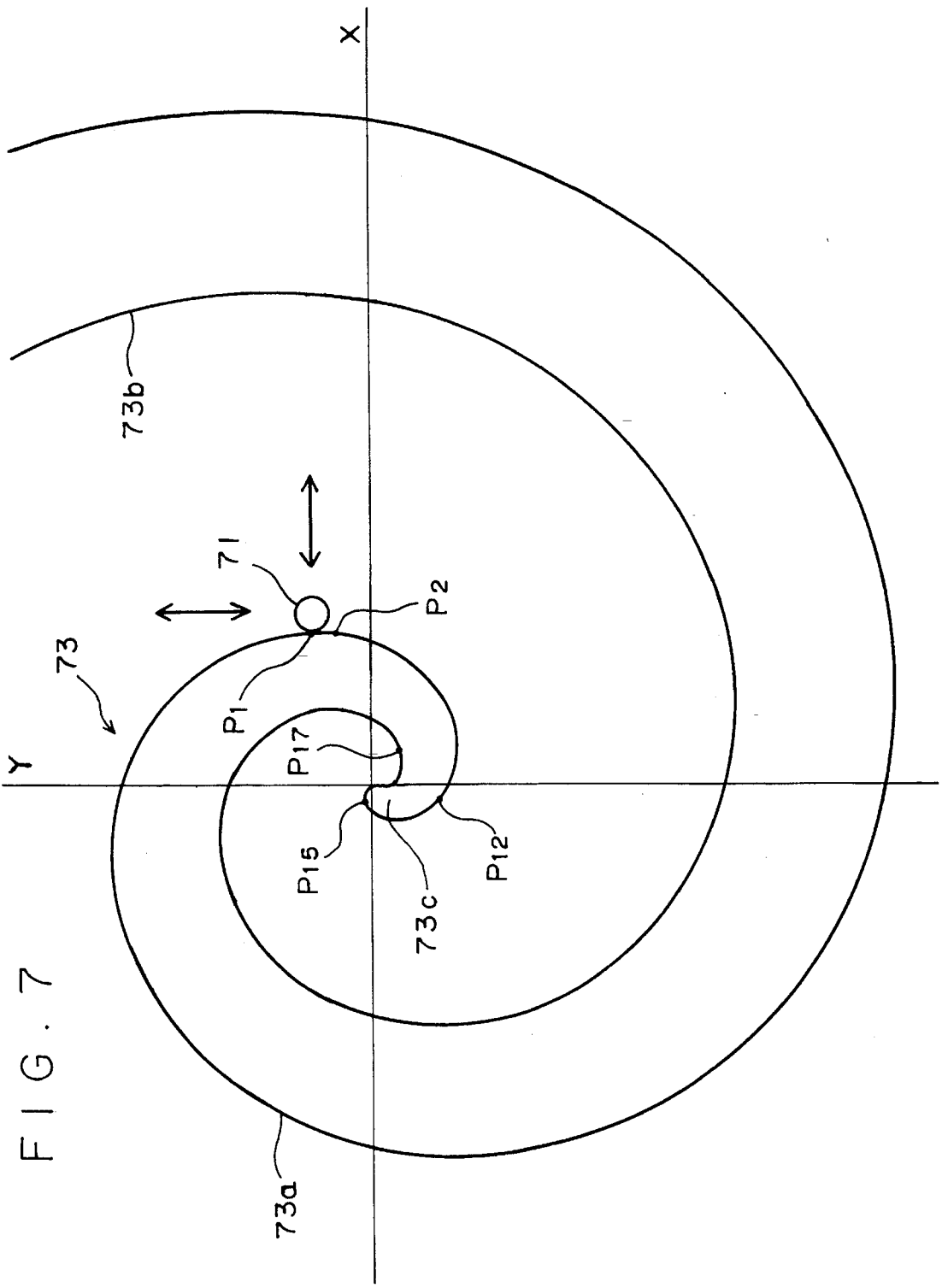

FIGS. 6(a) and 6(b) are explanatory charts showing the way of calculating the coordinate values of a machining point according to the present invention; and FIG. 7 is an explanatory chart showing the transition of machining from an outer surface to an inner surface of a scroll wall according to the present invention.

DETAILED DESCRIPTION OF THE PREFERRED EMBODIMENTS

Figure 3:
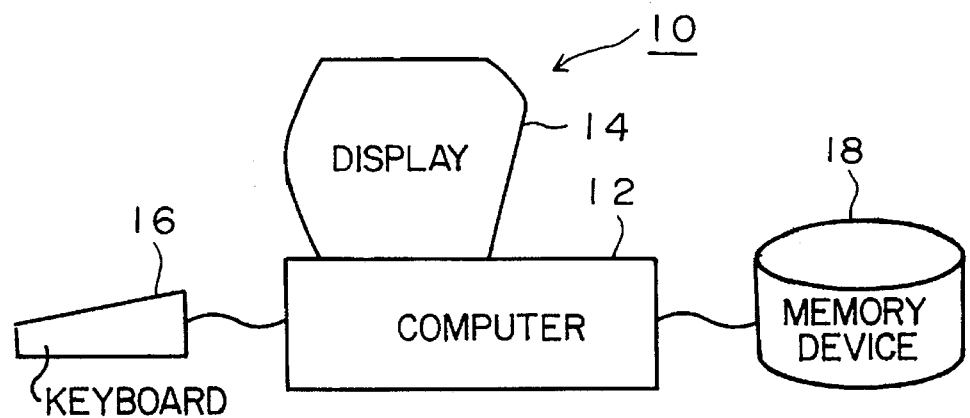
FIG. 3 is a block diagram showing an NC data preparation apparatus according to the present invention.

Referring now to FIG. 3, there is shown an NC data preparation apparatus 10 according to the present invention, which is composed of a computer 12, a display 14, a keyboard 16 and a memory device 18.

Figure 4:
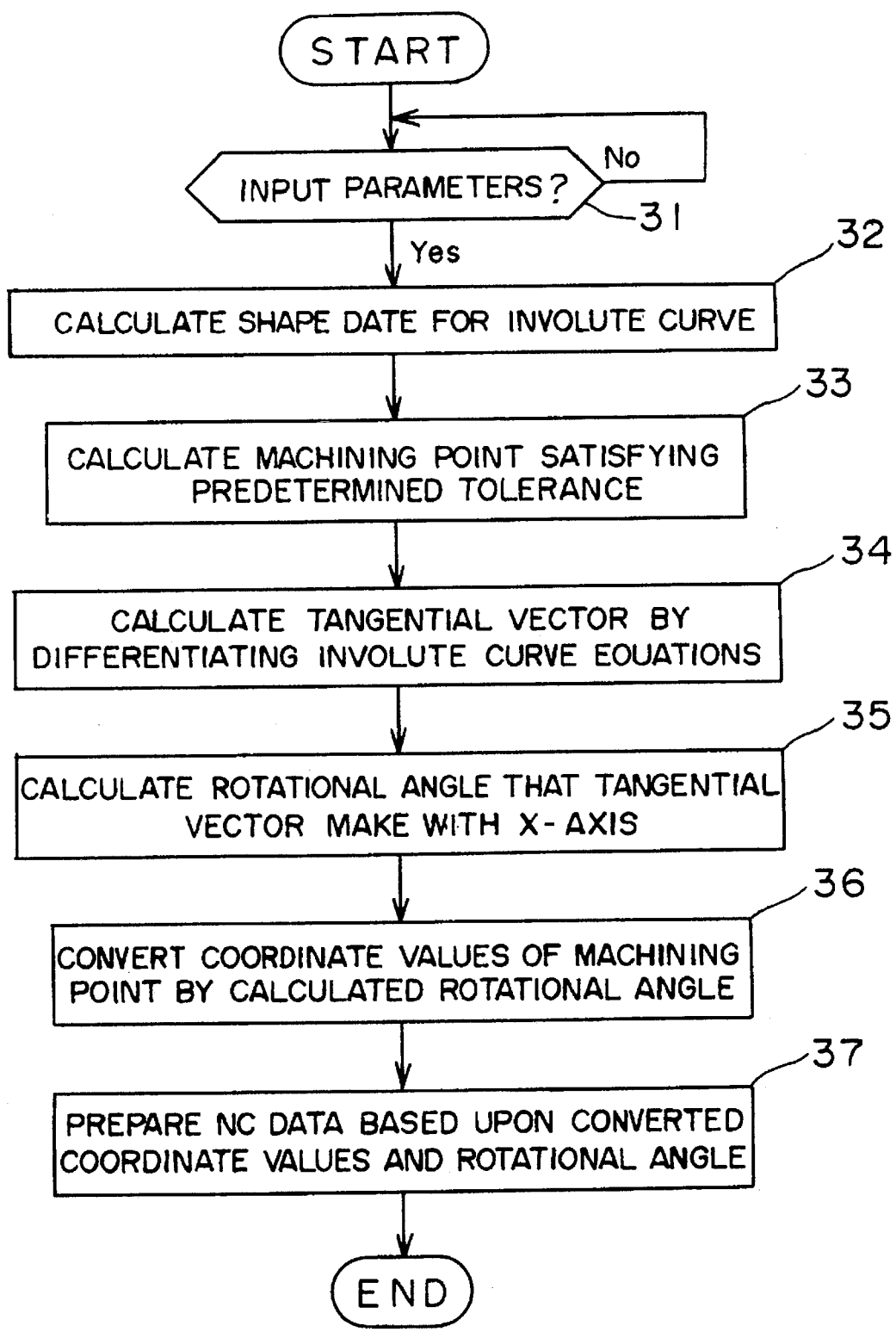
FIG. 4 is a flowchart showing the processings in the NC data preparation apparatus according to the present invention.

Next, the processings in the computer 12 will be explained with reference to FIG. 4.

Figure 5:
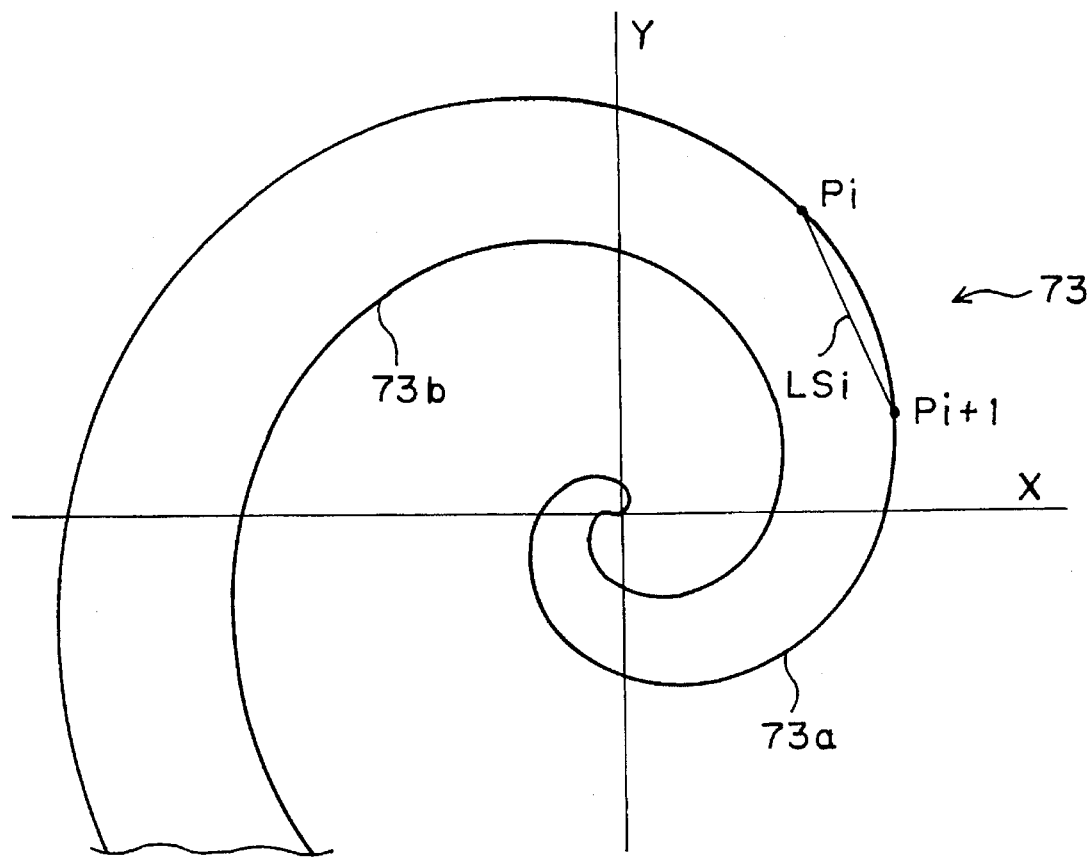
FIG. 5 is an explanatory chart showing the way of determining machining points along the involute curve according to the present invention.

First, an operator inputs parameters to the NC data preparation apparatus 10 through the keyboard 16 in order to determine an involute curve of a scroll plate or workpiece. The parameters include at least one geometric characteristic of the workpiece. For example, they include the radius (a) of a base circle, the expansion angle ($\phi$), a phase difference angle ($\alpha$) between outer and inner surfaces of a scroll wall to be machined on the workpiece, and an exponent (k) which determines the degree of expansion to angle of the involute curve. The parameters also include a tolerance used in determining a machining point next to the preceding one. After the parameters are input (judgment step 31 is YES), the computer 12 prepares shape data of the involute curve from the input parameters, displays the shape of the involute curve on the display 14 as shown in FIG. 5, and stores the shape data into the memory device 18. The shape data represents the coordinate values of points which are determined per a unit expansion angle, preferably 2 degree for example.

The computer 12 calculates the involute curve by substituting the input parameters into the following predetermined equations which have been stored in the memory device 18 in advance.

$$X=a \cdot (cos(\phi)+(\phi+\alpha)^k \cdot sin(\phi)) \quad (5)$$

$$Y=a \cdot (sin(\phi)-(\phi+\alpha)^k \cdot cos(\phi)) \quad (6)$$

$$X=a \cdot (cos(\phi)+(\phi-\alpha)^k \cdot sin(\phi)) \quad (7)$$

$$Y=a \cdot (sin(\phi)-(\phi-\alpha)^k \cdot cos(\phi)) \quad (8)$$

It is to be noted that the above equations (5) and (6) represent an outer wall 73a of the involute curve, while the equations (7) and (8) represent an inner wall 73b thereof.

Next, the computer 12 calculates a series of data determining machining points along the involute curve 73 (step 33). In this step, a machining point $P_{i+1}$ next to a preceding one $P_i$ is determined in such a way that the maximum deviation of a line segment $LS_i$ connecting through the preceding machining point $P_i$ and the next one $P_{i+1}$ from the calculated involute curve does not exceed a predetermined tolerance, as shown in FIG. 5. Thus, when the machining point is performed by the linear interpolation between the points $P_i$ and $P_{i+1}$, the accuracy of the surface (or line) thus machined can be maintained within the predetermined tolerance with respect to the calculated or ideal involute curve. As can be easily understood, since the involute curve has a larger curvature as it comes to the center thereof, the spacing between the machining point $P_i$ and the next one $P_{i+1}$ is narrowed. In reverse, the curvature becomes small as the involute curve extends outwards, so that the spacing of the two machining points is widened.

Successively, in step 34, the tangential vector at each of machining points on the ideal curve is calculated by substituting the aforementioned parameters into equations (dX/d$\phi$, dY/d$\phi$) which can be obtained by differentiating the aforementioned equations (5), (6), (7) and (8) with the expansion angle ($\phi$). FIG. 6(a) typically shows the tangential vector 79 at the machining point $P_1$.

Then, the processing advances to next step 35, wherein an angle (c) that the tangential vector 79 makes with the X-axis is calculated at each machining point. Thereafter, a complementary angle (f) which makes a right angle with the angle (c) is calculated. Then, in next step 36, the machining points $P_i$, $P_{i+1}$, $P_{i+2}$, ••••• on the ideal curve are rotated around the center of the involute curve, respectively by the rotational angles (that is to say, the complementary angles) of the respective machining points. FIG. 6(b) typically shows the involute curve which is rotated by the rotational angle ($f_1$) of the machining point $P_1$ shown in FIG. 6(a). In the final step 37, calculation is made for the coordinates (i.e., x', y' positions) of the machining points $P_i$, $P_{i+1}$, $P_{i+2}$, ••••on the ideal curve in the state that each of them is before the rotation of the involute curve in step 36, as for example, the point $P_i$ is on the point indicated in FIG. 6(a). This calculation is effected by substituting into the following matrix the rotational angle (f) and the coordinates (x, y) of each machining point at which the same was before the rotation in step 36.

$$\begin{bmatrix} x' \\ y' \end{bmatrix} = \begin{bmatrix} \cos(f) & -\sin(f) \\ -\sin(f) & \cos(f) \end{bmatrix} \begin{bmatrix} x \\ y \end{bmatrix} \qquad (9)$$

NC data is prepared from the calculated coordinate values (x', y') and the rotational angles (f) for the respective machining points. In the case that a numerical controller used in controlling a machine tool to machine the involute curve is of incremental control type, incremental position data along the X and Y-axis are calculated from the differences of the coordinate values $(x_{i+1}'-x_i', y_{i+1}'-y_i')$ between a machining point $P_i'$ and the next one $P_{i+1}'$ and an incremental rotational angle is calculated from the difference of the rotational angle $(f_{i+1}-f_i)$ of the machining points $(P_{i+1}-P_i)$. The aforementioned processings are executed for all the machining points $P_i, P_{i+1}, P_{i+2}, \cdots$, whereby the NC data for the involute curve is prepared.

In the case that the numerical controller is of the absolute control type, the calculated coordinate values (x', y') and the rotational angle $(f_i)$ are used as there are. Specifically, the NC data is composed of numerous data blocks each including the rotational angle (f) and the X and Y-axis position data (x', y')

Figure 1:
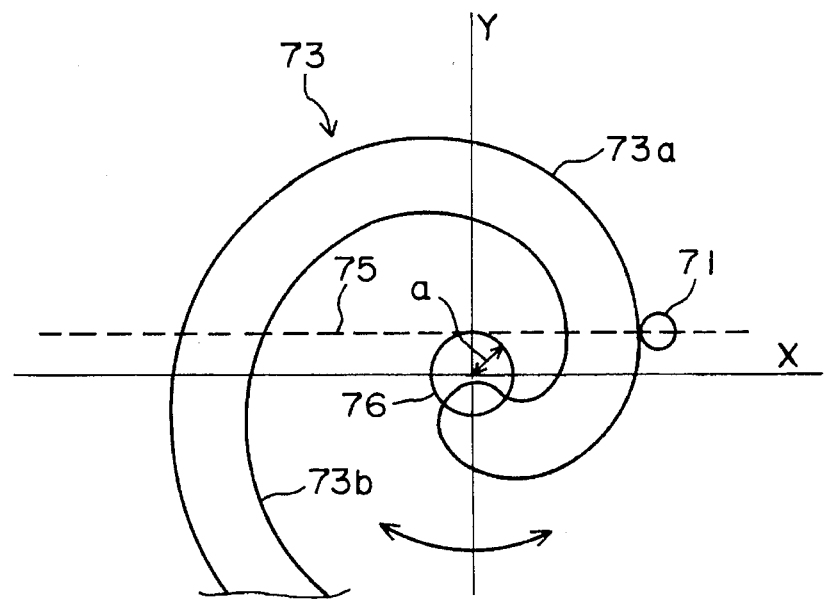
FIG. 1 is an explanatory chart showing the relationship between a tool, a base circle and a conventional involute curve.
Figure 2:
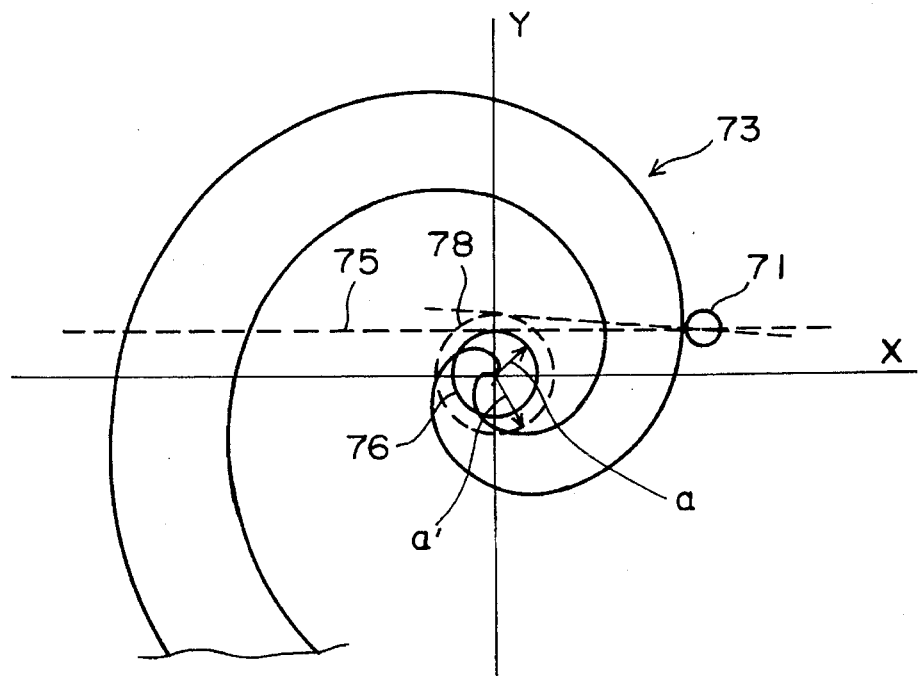
FIG. 2 is an explanatory chart showing the relationship between the tool, the base circle, an equivalent base circle and an involute curve according to the present invention.

Next, description will be made hereinafter with the machining of the workpiece 73 according to the NC data prepared by the aforementioned processings. As described before with reference to FIG. 1 and 2, the machining of the workpiece under three-axis control of X, Y and C-axes was possible in the conventional machine tool, wherein a simultaneous two-axis control of X and C-axes was performed in such a way that the tool 71 is moved along the base line 75 parallel to the X-axis, which is offset by the radius (a) of the base circle 76, as the workpiece 73 is rotated around the C-axis. Further, since at a portion close to the center of the involute curve, the shape of that portion was defined as not the involute curve but as a combination of plural arcs, the machining of that portion was carried out by changing the control mode from the two-axis control to the three-axis control involving X, Y and C-axes.

In the instant embodiment, to the contrary, a machine tool similar to that used in the prior art is used, but the machining of the involute curve is carried out according to the NC data prepared for the simultaneous three-axis control of the X, Y and C-axes, as described hereinafter.

First, the operator transmits the prepared NC data from the NC data preparation apparatus 10 to the numerical controller of the machine tool (not shown). After the NC data is input and the machining start command is instructed by the operator, the machine tool machines the scroll plate 73 according to the NC data to form the involute curve thereon. This machining will be described in more detail with reference to FIG. 7 showing a plan view of the workpiece of scroll plate 73.

The machine tool, according to the NC data prepared for a series of machining points $P_i, P_{i+1}, P_{i+2}, \cdots$, on the involute curve shown in FIG. 5, rotates the workpiece 73 counterclockwise around the C-axis and at the same time, moves the tool 71 along the X and Y-axes, whereby the outer wall 73a of the workpiece 73 is machined. As is well known, the locations of the tool 71 between a machining point $P_i$ and the next one $P_{i+1}$ are determined by e.g., the linear interpolation.

In this embodiment, the NC data for the machining of the scroll plate is prepared based upon a shape wherein the end portion 73c close to the center of the workpiece (scroll plate) 73 is defined as not the involute curve but as the combination of the plural arcs. Also in this embodiment, the machining of the portion 73c is advanced from the machining point $P_{12}$ shown in FIG. 7 according to those data blocks of the NC data prepared based upon the combination of the plural arcs. The machining based upon the combination of the plural arcs can be continuously done without disengaging the tool 71 from the workpiece 73.

In the case of the prior art using the NC data prepared for machining the involute curve under the simultaneous two-axis control of the X and C-axes, it is required at a machining point corresponding to the aforementioned $P_{12}$ to change the control mode from the simultaneous two-axis control for the involute curve to the simultaneous three-axis control for the arcs. Therefore, the tool 71 has to be once separated from the workpiece 73 at the machining point $P_{12}$ and then, has to be again approached the same after changing the control mode to the three-axis control. Because the tool 71 is disengaged from the workpiece 73 at the the machining point at which the control mode is changed, the machining is discontinuous to deteriorate the machining accuracy.

In this embodiment, however, the machining is carried out under the simultaneous three-axis control from the very beginning thereof, and the number of control axes in machining at the machining point $P_{12}$ remains unchanged. As a result, the machining of all the portions of the scroll walls can be continuously carried out without separating the tool 71 from the workpiece 73, whereby the machining accuracy can be improved.

When the machine tool continues the cutting operation from the machining point $P_{12}$ to locate the tool 71 at a point $P_{15}$ which is closest to the center of the workpiece 73, it changes the rotational direction of the C-axis to the opposite direction (i.e., clockwise) to then, begin the machining of the inner wall 73b. Subsequently, even when the tool 71 reaches from the end portion 73c which is defined as the combination of the arcs of the workpiece 73, to a machining point $P_{17}$ which is at a border to the portion defined as the involute curve, the machine tool continues the machining according to the NC data prepared based upon the involute curve, without disengaging the tool 71 from the workpiece 73, whereby the machining of the outer and inner walls of the scroll plate can be completed.

In the aforementioned embodiment, the NC data is prepared by calculating an angle (f) through which the involute curve has to be rotated to make the tangential vector 79 at each machining point intersect the X-axis and then, by rotating the involute curve through the calculated angle until the tangential vector at each such machining point crosses the X-axis at the right angle. Alternatively, the NC data may be prepared by calculating an angle through which the involute curve has to be rotated to make the tangential vector 79 at each such machining point intersect the Y-axis and then, by rotating the involute curve through the calculated angle until the tangential vector 79 crosses the Y-axis at the right angle.

In this modified case, the prepared NC data is used to move the tool 71 primary along a base line 75' indicated by phantom line in FIG. 6(b) as the expansion angle of the involute curve advances and at the same time, to move the tool 71 along the X-axis simultaneously with the movement along the Y-axis. It is to be noted that the base line 75' in the modified case is the Y-axis per se of the coordinate system in machining and that in the coordinate system in preparing the NC data, the base line 75' is parallel to the Y-axis and offset by the radius (a) of the base circle 76 in the X-axis direction.

It is also to be noted that the NC data prepared according to the present invention can be used in any type of machine tools which have mutually perpendicular two axes within a single plane and a rotational axis normal to the single plane.

Obviously, numerous modifications and variations of the present invention are possible in light of the above teachings. It is therefore to be understood that within the scope of the appended claims, the present invention may be practiced otherwise than as specifically described herein.

What is claimed is:

1. A method for preparing NC data used in machining an involute curve on a workpiece by relatively moving a tool and the workpiece along mutually perpendicular first and second axes encompassed within a plane while relatively rotating said tool and said workpiece about a third axis which is perpendicular to said plane, said method comprising the steps of:

(1) defining in a computer said involute curve based upon input parameters including at least one geometric Characteristic of the workpiece;
 (2) calculating on the computer a series of machining points on said involute curve;
 (3) calculating on the computer a tangential line which connects said involute curve at each of said machining points;
 (4) calculating on the computer a conversion angle through which each of said machining points is to be rotated about said third axis so as to make said tangential line at each of said machining points intersect one of said first and second axes at a right angle;
 (5) converting on the computer coordinate values of each of said machining points into modified coordinate values which each of said machining points would have if the same were rotated about said third axis through said conversion angle calculated in said step (4); and
 (6) preparing NC data of numerous data blocks each including said conversion angle and said converted coordinate values of each of said machining points.

2. A method for preparing NC data according to claim 1, wherein said step (2) calculates said machining points in such a way that the deviation from said involute curve of a line connecting one of said machining points and another next thereto does not exceed a predetermined tolerance.

3. A method for preparing NC data according to claim 1, wherein said parameters for defining said involute curve includes data for gradually enlarging the base circle of said involute curve as the expansion angle thereof goes.

4. A method for preparing NC data according to claim 1, wherein said step (1) defines said involute curve in accordance with the following equations $$X=a \cdot (cos(\phi)+(\phi+\alpha)^k \cdot sin(\phi))$$

$$Y=a \cdot (sin(\phi)-(\phi+\alpha)^k \cdot cos(\phi)).$$

5. An apparatus for preparing NC data used in machining an involute curve on a workpiece by relatively moving a tool and the workpiece along mutually perpendicular first and second axes encompassed within a plane while relatively rotating said tool and said workpiece about a third axis which is perpendicular to said plane, said apparatus comprising:

involute curve definition means for defining said involute curve based upon input parameters;
 machining point calculation means for calculating a series of machining points on said involute curve;
 tangential line calculation means for calculating a tangential line which connects said involute curve at each of said machining points;
 angle calculation means for calculating a conversion angle through which each of said machining points is to be rotated about said third axis so as to make said tangential line at each of said machining points intersect one of said first and second axes at a right angle;
 coordinate conversion means for converting coordinate values of each of said machining points into modified coordinate values which each of said machining points would have if the same were rotated about said third axis through said conversion angle calculated by said angle calculation means; and
 data preparation means for preparing NC data of numerous data blocks each including said conversion angle and said converted coordinate values of each of said machining points.

6. An apparatus for preparing NC data according to claim 5, wherein said machining point calculation means calculates said machining points in such a way that the deviation from said involute curve of a line connecting one of said machining points and another next thereto does not exceed a predetermined tolerance.

7. An apparatus for preparing NC data according to claim 5, wherein said NC data is used in a machine tool of type that said tool is movable along said first and second axes while said workpiece is rotatable about said third axis.

8. An apparatus for preparing NC data according to claim 5, wherein said parameters for defining said involute curve includes data for gradually enlarging the base circle of said involute curve as the expansion angle thereof goes.

9. An apparatus for preparing NC data according to claim 5, wherein said involute curve definition means defines said involute curve in accordance with the following equations.

$$X=a \cdot (cos(\phi)+(\phi \pm \alpha)^k \cdot sin(\phi))$$

$$Y=a \cdot (sin(\phi)-(\phi+\alpha)^k \cdot cos(\phi)).$$

\* \* \* \* \*